US010230869B2

(12) United States Patent
Ishimura (10) Patent No.: US 10,230,869 B2
(45) Date of Patent: Mar. 12, 2019

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventor: Takanari Ishimura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 3 days.

(21) Appl. No.: 15/246,623

(22) Filed: Aug. 25, 2016

(65) Prior Publication Data

US 2017/0280020 A1 Sep. 28, 2017

(30) Foreign Application Priority Data

Mar. 24, 2016 (JP) ................................. 2016-059945

(51) Int. Cl.
*H04N 1/44* (2006.01)
*H04N 1/00* (2006.01)

(52) U.S. Cl.
CPC ....... *H04N 1/4433* (2013.01); *H04N 1/00307* (2013.01); *H04N 1/00344* (2013.01); *H04N 2201/0039* (2013.01); *H04N 2201/0041* (2013.01); *H04N 2201/0055* (2013.01); *H04N 2201/0094* (2013.01)

(58) Field of Classification Search
CPC ............. H04N 1/4433; H04N 1/00307; H04N 1/00344; G06F 3/1292
USPC ........................ 358/1.11–1.18; 709/201–203; 455/41.1–41.3
See application file for complete search history.

(56) References Cited

U.S. PATENT DOCUMENTS

| | | | | |
|---|---|---|---|---|
| 2005/0055547 A1* | 3/2005 | Kawamura | ............. | G06F 21/31 713/155 |
| 2005/0138137 A1* | 6/2005 | Encarnacion | ..... | G06F 17/30887 709/217 |
| 2005/0138192 A1* | 6/2005 | Encarnacion | ....... | H04L 12/2812 709/230 |
| 2013/0057897 A1* | 3/2013 | Park | ...................... | G06F 21/608 358/1.14 |
| 2013/0070297 A1* | 3/2013 | Kato | .................. | H04N 1/00217 358/1.15 |
| 2013/0198412 A1* | 8/2013 | Saito | ................. | H04L 29/12009 709/245 |
| 2014/0085676 A1* | 3/2014 | Kishimoto | ......... | H04N 1/00233 358/1.15 |

(Continued)

FOREIGN PATENT DOCUMENTS

JP    2015-166944    9/2015

*Primary Examiner* — Chad Dickerson (74) *Attorney, Agent, or Firm* — Fildes & Outland, P.C.

(57) ABSTRACT

An information processing apparatus includes: a first wireless, communication unit; a first acquisition unit that acquires first identification information which identifies a second wireless communication unit that is included in an external wireless terminal device, through the first wireless communication unit; and a use authorization unit that gives use authorization associated with the first identification information which is acquired by the first acquisition unit to a user of the wireless terminal device based on a table for managing the use authorization of a function of a host information processing apparatus in association with the first identification information.

4 Claims, 9 Drawing Sheets

(56) References Cited

U.S. PATENT DOCUMENTS

| | | | | |
|---|---|---|---|---|
| 2014/0118765 A1* | 5/2014 | Yang | .................. | G03G 15/5004 |
| | | | | 358/1.13 |
| 2014/0362841 A1* | 12/2014 | Shibata | ................. | H04W 48/18 |
| | | | | 370/338 |
| 2015/0116746 A1* | 4/2015 | Park | ..................... | G06F 3/1263 |
| | | | | 358/1.13 |
| 2016/0212297 A1* | 7/2016 | Nagasawa | ............. | G06F 3/1293 |

* cited by examiner

| ITEM | CLIENT CA | CLIENT CB |
|---|---|---|
| Wi-Fi DIRECT DEVICE ADDRESS | 99:88:77:66:55:45 | 02:11:22:33:44:55 |
| Wi-Fi DIRECT INTERFACE ADDRESS | 9B:88:77:66:55:45 | 02:11:22:33:C4:55 |
| Wi-Fi MAC ADDRESS | 99:88:77:66:55:44 | 00:11:22:33:44:55 |
| CHIPSET INFORMATION | A COMPANY | B COMPANY |
| COMPUTER NAME | Prosessor11 | Default- |
| IP ADDRESS | 192.168.0.101 | 192.168.0.201 |
| USE AUTHORIZATION | CONTRACT USER AUTHORIZATION | TEMPORARY USER AUTHORIZATION |

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-059945 filed on Mar. 24, 2016.

BACKGROUND

Technical Field

The present invention relates to an information processing apparatus, an information processing method, and a non-transitory computer readable medium.

SUMMARY

According to an aspect of the invention, there is provided an information processing apparatus including: a first wireless communication unit; a first acquisition unit that acquires first identification information which identifies a second wireless communication unit that is included in an external wireless terminal device, through the first wireless communication unit; and a use authorization milt that gives use authorization associated with the first identification information which is acquired by the first acquisition unit to a user of the wireless terminal device based on a table for managing the use authorization of a function of a host information processing apparatus in association with the first identification information.

BRIEF DESCRIPTION OF THE DRAWINGS

Exemplary embodiments of the present invention will be described in detail based on the following figures, wherein.

DETAILED DESCRIPTION

An exemplary embodiment of the invention will be described with reference to the drawings.

Figure 1:
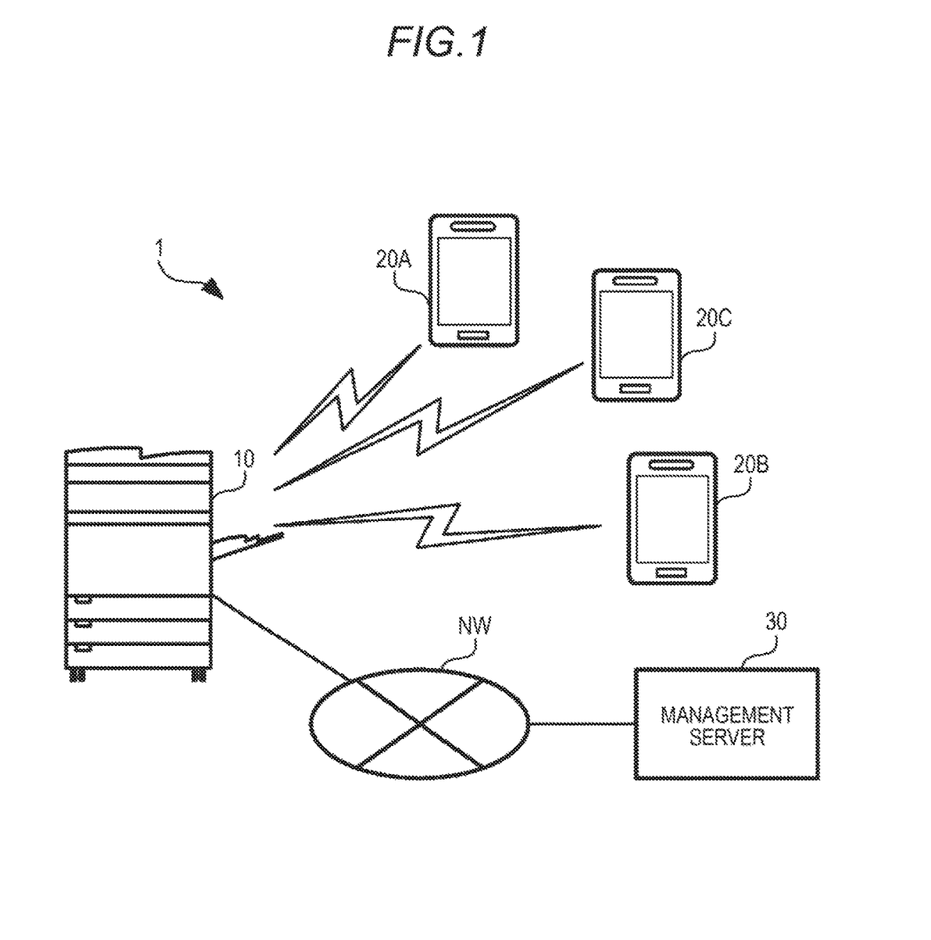
FIG. 1 is a perspective view illustrating, an external configuration of an information processing system according to an exemplary embodiment of the invention.

FIG. 1 is a view illustrating the entire configuration of an information processing system 1. As illustrated in FIG. 1, the information processing system 1 includes an information processing apparatus 10, multiple wireless terminal devices 20, and a management server 30. FIG. 1 illustrates three wireless terminal devices 20A, 20B, and 20C, among, the multiple wireless terminal devices 20. The information processing apparatus 10 and the management server 30 are connected to each, other through a communication line NW. The communication line NW includes a public communication line, for example, a mobile communication network, a gateway device, and the Internet, but may include other communication lines (communication networks) such as a local area network (LAN). In addition, the information processing apparatus 10 performs wireless communication with each of the multiple wireless terminal devices 20 without passing through the communication line NW. Here, the wireless communication uses a Peer to Peer type.

The information processing apparatus 10 provides users of the wireless terminal devices 20 with multiple functions (services), such as a print function, a copy function, a scan function, and a facsimile transmission function. The information processing apparatus 10 performs processing instructed by the wireless terminal devices 20 in accordance with use authorization given to the wireless terminal devices 20. The use authorization indicates authorization to use the function of the information processing apparatus 10, and specifies, for example, an available function (type of function) or a condition (for example, fee) for using the function. It is assumed that the wireless terminal devices 20A, 208, and 20C are respectively used (owned) by users different from each other.

Here, the wireless terminal devices 20 indicate smart phones. However, the wireless terminal devices 20 may be wireless terminal devices, such as mobile phone terminals or tablet terminals, notebook computers, personal digital assistant (PDA), or portable game machines.

The management server 30 is a server device which manages use authorization of a function given to the information processing apparatus 10. The management server 30 manages data on an account assigned to each of the users of the multiple wireless terminal devices 20.

Figure 2:
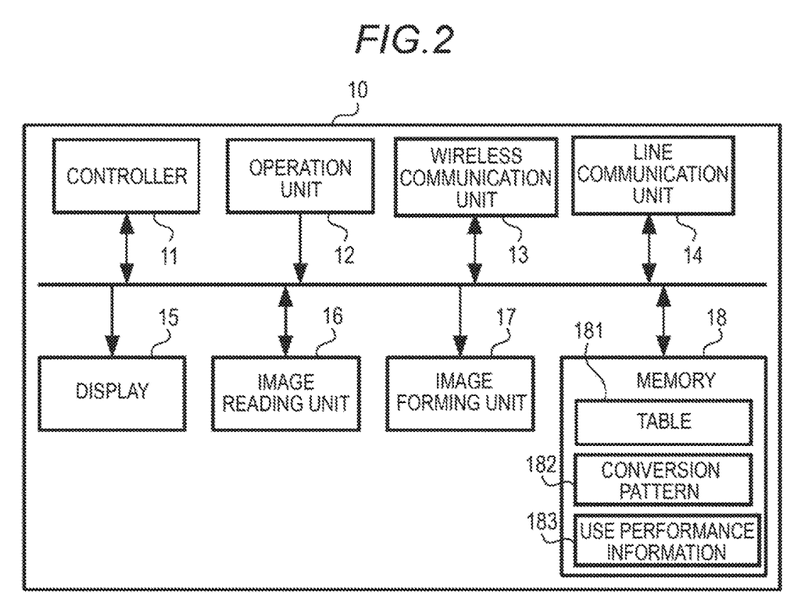
FIG. 2 is a block diagram illustrating a hardware configuration of an information processing apparatus according to the present exemplary embodiment.

FIG. 2 is a block diagram illustrating a hardware configuration of the information processing apparatus 10. As illustrated in FIG. 2, the information processing apparatus 10 includes a controller 11, an operation unit 12, a wireless communication unit 13, a line communication unit 14, a display 15, an image reading unit 16, an image forming trait 17, and a memory 18.

The controller 11 includes an arithmetic device such as a central processing unit (CPU), and a memory, and controls each unit of the information processing apparatus 10. The operation unit 12 is an operation device which is operated by a user, and includes, for example, a touch screen which is provided in a manner of overlapping a display surface of the display 15, or physical keys. The wireless communication unit 13 is an example of a first wireless communication unit according to the exemplary embodiment of the invention, and performs wireless communication of a Peer to Peer type. Here, the wireless communication unit 13 performs wireless communication according to Wi-Fi® direct. The Wi-Fi direct means wireless communication of directly connecting Wi-Fi enabled devices to each other.

The line communication unit 14 performs communication by being, connected to the communication line NW by wired or wirelessly. The display 15 is, for example, a liquid crystal display, and notifies a user by displaying various images (screens) on a display surface on which an image is displayed. The image reading unit 16 is, for example, a scanner, reads an image of an original document, and supplies the controller 11 with image data indicating the read image. The image forming unit 17 is a printer which forms an image, on a sheet such as paper through, for example, an electrophotographic process.

The memory 18 includes, for example, a hard disk device, and stores a table 181, a conversion pattern 182, and use performance information 183, in addition to a program which is performed by the controller 11. The table 181 is provided for managing use authorization of the functions of the information processing apparatus 10 given to the wireless terminal devices 20 in association with a Wi-Fi MAC address. The Wi-Fi MAC address is an example of first identification information and a physical address according to the exemplary embodiment of the invention, and is identification information that identifies a wireless communication unit 23 which is included M the wireless terminal devices 20 and will be describe below.

Figure 3:
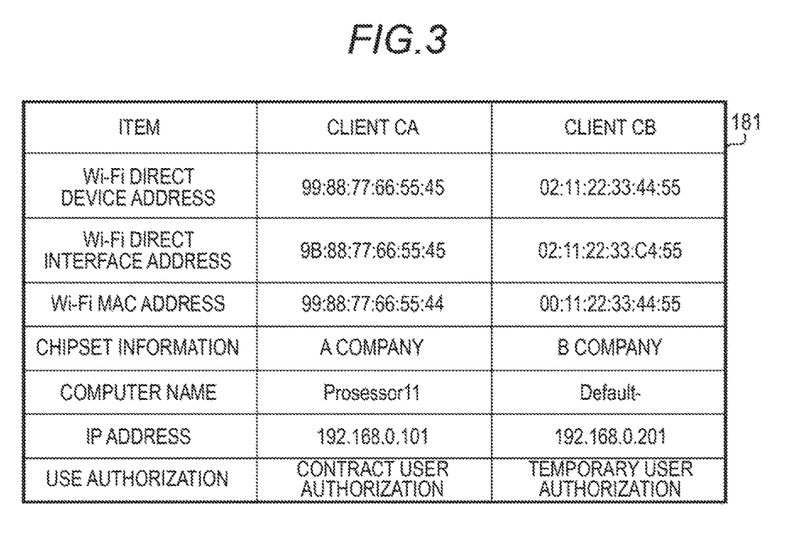
FIG. 3 is a diagram illustrating an example of a table according to the present exemplary embodiment.

FIG. 3 is a diagram illustrating an example of the table 181. As illustrated in FIG. 3, the table 181 stores Wi-Fi direct device addresses. Wi-Fi direct interface addresses, Wi-Fi MAC addresses, chipset information, computer names, IP addresses, and information on use authorization, with respect to each of a client CA and a client CB. The client CA corresponds to the wireless terminal device 20A, and the client CB corresponds to the wireless terminal device 20B.

It is assumed that the table 181 illustrated in FIG. 3 does not store information on the wireless terminal device 20C.

The Wi-Fi direct device address realizes a connection by the Wi-Fi direct. The WI-Fi direct interface address is used for wireless communication after the connection is made. The Wi-Fi MAC address is a physical address assigned in advance in the, wireless communication unit 23 of the wireless terminal device 20.

The direct device address and the Wi-Fi direct interface address are generated by converting the Wi-Fi MAC address in accordance with a predetermined rule (hereinafter, referred to as "conversion pattern"). Here, the conversion pattern is uniquely determined accordance with chipset information. The chipset information includes information specifying a vendor which provides the wireless communication unit 23 of the wireless terminal device 20. The table 181 illustrated in FIG. 3 stores "A company" as the chip information on the client CA, and "B company" as the chip information on the client CB.

The computer name is an example of second identification information according, to the exemplary embodiment of the invention, and is identification information assumed to the wireless terminal device 20. The computer name includes a character string in which characters or numbers, and symbols are combined.

The IP addresses are, assigned to the wireless terminal devices 20. The use authorization is given to the wireless terminal devices 20. A "contract user authorization" is given to a user which contracts to use the functions of the information processing apparatus 10. The contract user authorization is given to, for example, a user which pays a fixed monthly fee or an employee which belongs to a business office where the information processing apparatus 10 is provided. A "temporary user authority" is given to a user without the contract user authorization. The user to which the temporary user authority is given can temporarily use the function of the information processing apparatus 10 by paying, for example, the determined fee.

It is assumed that the table 181 is updated as the information processing apparatus 10 communicates with the management server 30 at an appropriate timing (for example, regular).

The use performance information 183 is used for managing information on use results of the function of the information processing apparatus 10 for each user of the wireless terminal devices 20, and the use results include, for example, a used function (type of function), content (for example, the number of prints, setting related to printing, or the like) of processing which is performed, use fee, and the like.

Figure 4:
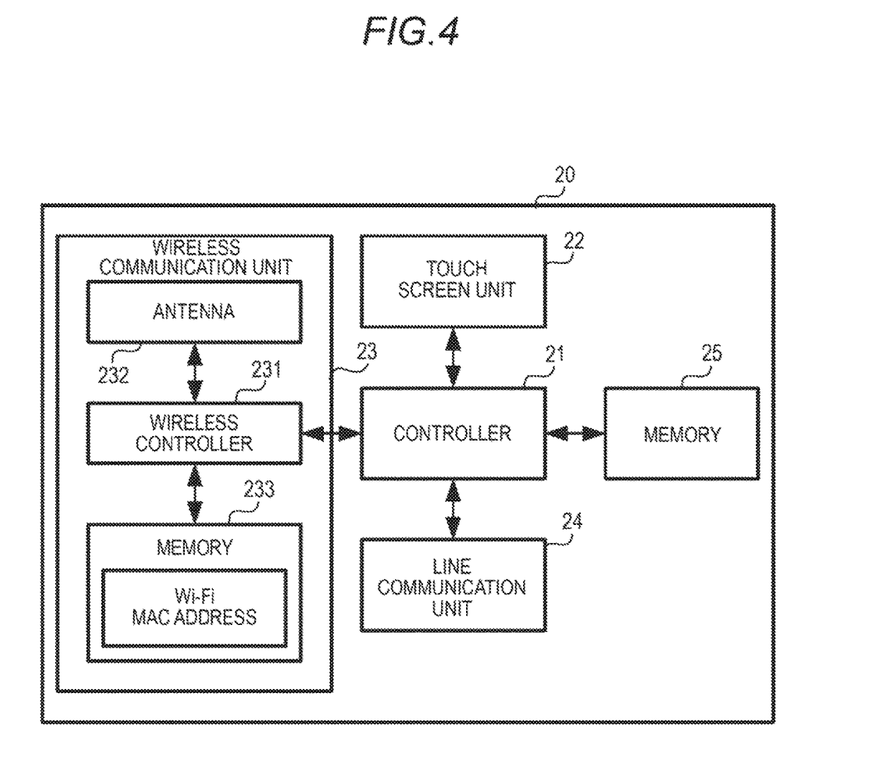
FIG. 4 is a block diagram illustrating a hardware configuration, of a wireless terminal device according to the present exemplary embodiment.

FIG. 4 is a block diagram illustrating a hardware configuration of the wireless terminal device 20. As illustrated in FIG. 4, the wireless terminal device 20 includes a controller 21 a touch screen unit 22, the wireless communication unit 23, a line communication unit 24, and a memory 25.

The controller 21 includes a microcomputer having a CPU, a read only memory (ROM), and a random access memory (RAM). The CPU controls each unit of the wireless terminal device 20 by reading a program stored in the ROM or the memory 25, storing the program in the RAM, and executing the program.

The touch screen unit 22 includes a display and a touch sensor. The display is, for example, a liquid crystal display, and displays various images on a display surface. The touch sensor is provided in a surface shape so as to overlap the display surface, and senses an operation of a user which is made on the display surface in accordance with a predetermined method (for example, a resistance film method or capacitance method).

The wireless communication unit 23 is an example of a second wireless communication unit according to the exemplary embodiment of the invention, and performs wireless communication of a Peer to Peer type. Here, the wireless communication unit 23 performs wireless communication in accordance with the Wi-Fi direct. The wireless communication unit 23 includes a wireless controller 231, an antenna 232, and a memory 233. The wireless controller 231 controls an operation of the wireless communication unit 23. The antenna 232 performs transmission and reception of a signal related to wireless communication. The memory 233 corresponds to an identification information memory which stores the Wi-Fi MAC address.

The wireless communication unit 23 may be embedded in the wireless terminal device 20, and may be a device, which is attachable to or detachable from the wireless terminal device 20, such as a data communication card.

The line communication unit 24 performs communication by being wirelessly connected to the communication line NW. The memory 25 includes, for example, an electrically erasable and programmable ROM (EEPROM) or a flash memory, and stores a program which is executed by the controller 21 or a computer name.

Figure 5:
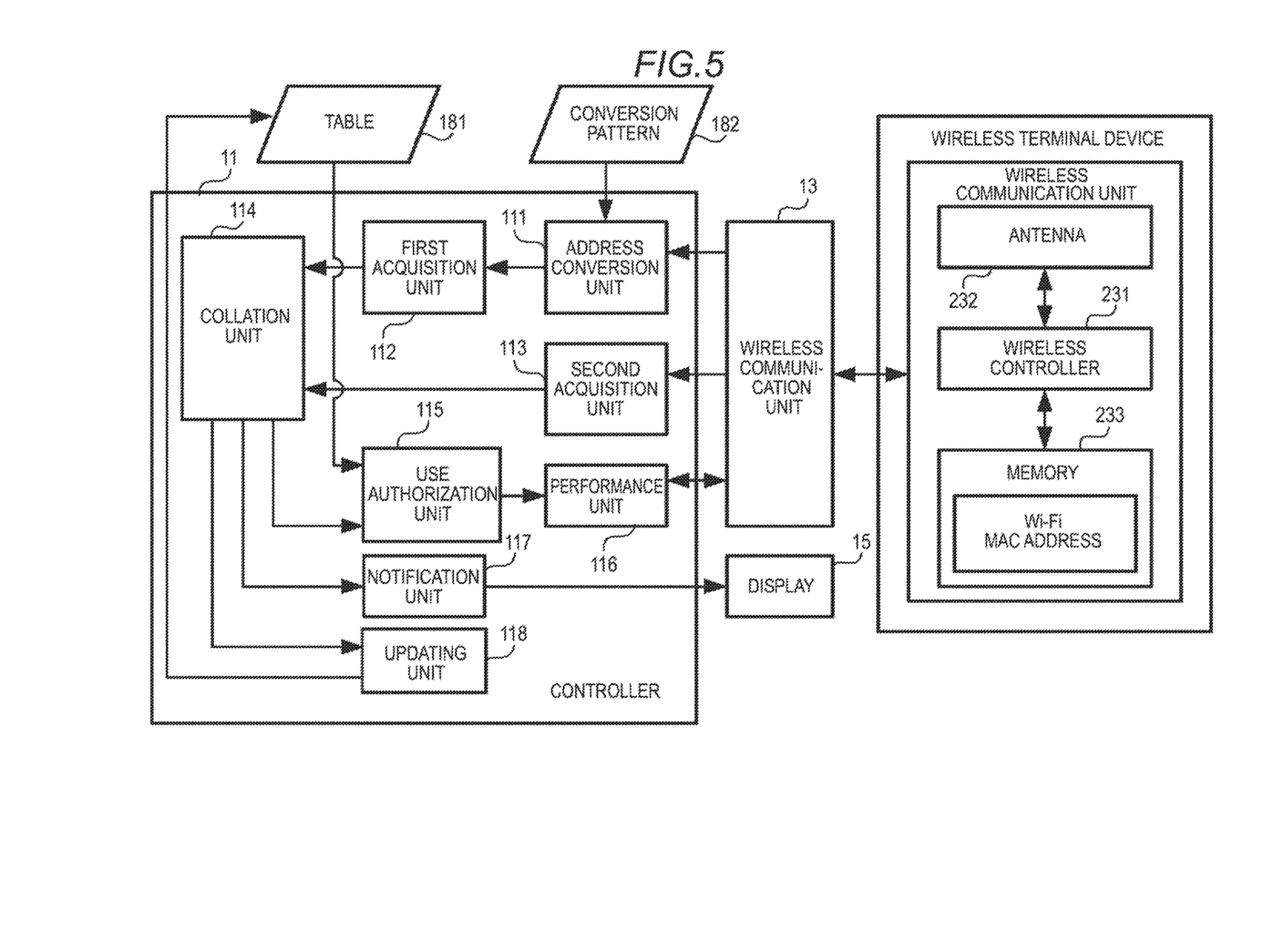
FIG. 5 is a block diagram illustrating a functional configuration of the information processing apparatus according to the present exemplary embodiment.

FIG. 5 is a block diagram illustrating a functional configuration of the controller 11 of the information processing apparatus 10. The controller 11 performs functions corresponding to an address conversion unit 111, a first acquisition unit 112, a second acquisition unit 113, a collation unit 114, a use authorization unit 115, a performance unit 116, a notification unit 117, and an updating unit 118.

The address conversion unit 111 converts a Wi-Fi direct device address which is transmitted by the wireless terminal device 20 and is received from the wireless communication unit 13, into Wi-Fi MAC address in accordance with the conversion pattern 182.

The first acquisition unit 112 acquires the Wi-Fi MAC address, which is assigned to the wireless communication unit 23 of the wireless terminal device 20, through the wireless communication unit 13. Here, the first acquisition unit 112 acquires the Wi-Fi MAC address from the address conversion unit 111.

The second acquisition unit 113 acquires the computer name assigned to the wireless terminal device 20 from the wireless terminal device 20 through the wireless communication unit 13. Here, the second acquisition unit 113 receives the computer name which is transmitted by the wireless communication unit 23, and acquires the computer name.

The collation unit 114 collates the Wi-Fi MAC address acquired by the first acquisition unit 112 and the computer name acquired by the second acquisition unit 113 with a MAC address and the computer name which are registered in a table T. The collation unit 114 determines whether or not each of the MAC address and the computer name coincides.

The use authorization unit 115 gives use authorization of the function of the information processing apparatus 10 to a user of the wireless terminal device 20, based on results of the collation performed by the collation unit 114, and the table 181. Here, giving of the use authorization means processing of enabling the function of the information processing apparatus 10 to be used in accordance with the use authorization, and means, for example, processing of updating the table T or updating the data which is managed by the management server 30.

The performance unit 116 performs processing, which is instructed by the wireless terminal device 20 in accordance with the use authorization given by the use authorization unit 115. If performing of the processing is instructed by the information processing apparatus 10 after the use authorization is given, the performance unit 116 performs the processing in accordance with the use authorization.

In a case where the computer name acquired by the second acquisition unit 113 is not associated with the use authorization associated with the Wi-Fi MAC address acquired by the first acquisition unit 112, in the table T, based on the results of the collation performed by the collation unit 114, the notification unit 117 makes notification. The notification indicates warning to the effect that there is a possibility of spoofing by a third party.

In a case where the Wi-Fi MAC address acquired by the second acquisition unit 113 is not associated with the use authorization associated with the computer name acquired by the first acquisition unit 112 in the table T, based on the results of the collation performed by the collation unit 114, the updating unit 118 updates the table 181 such that the Wi-Fi MAC address is associated therewith.

Figure 6:
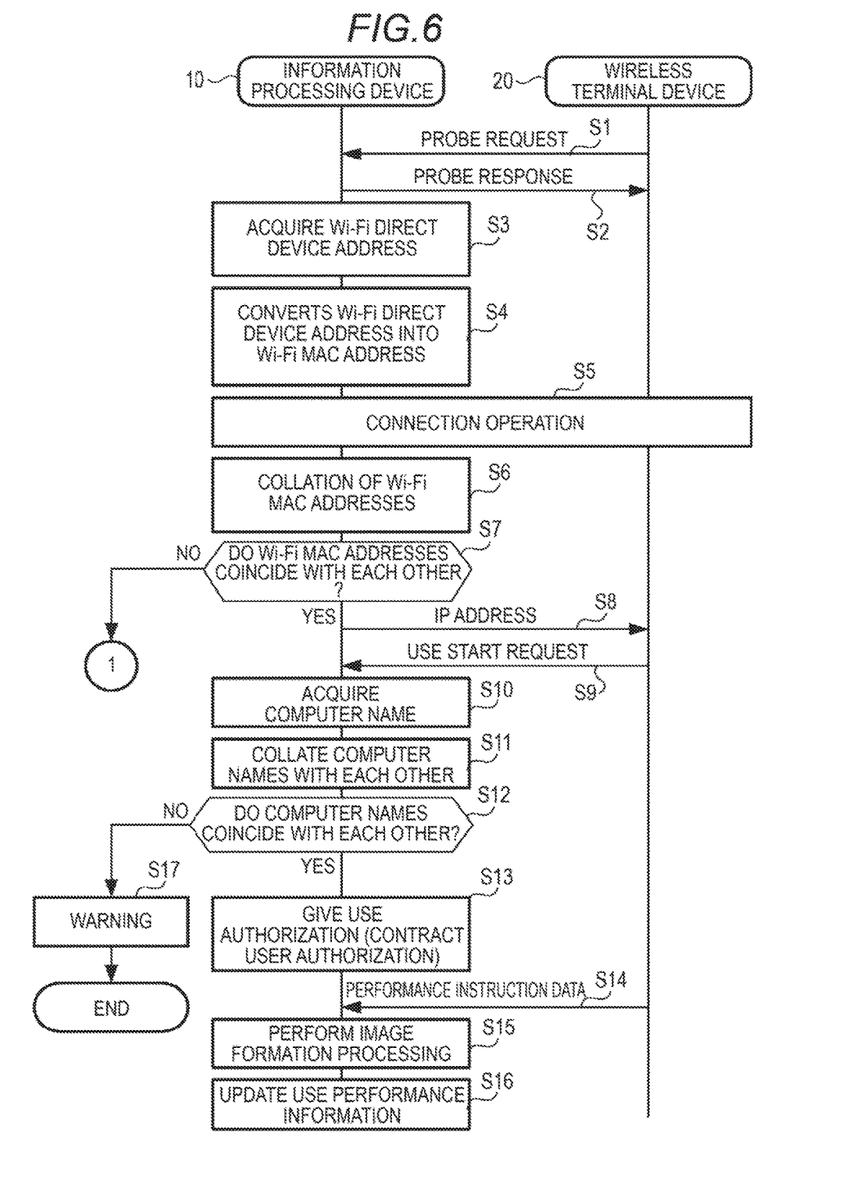
FIG. 6 is a sequence chart illustrating flow of processing which is performed by the information processing system according to the present exemplary embodiment.
Figure 7:
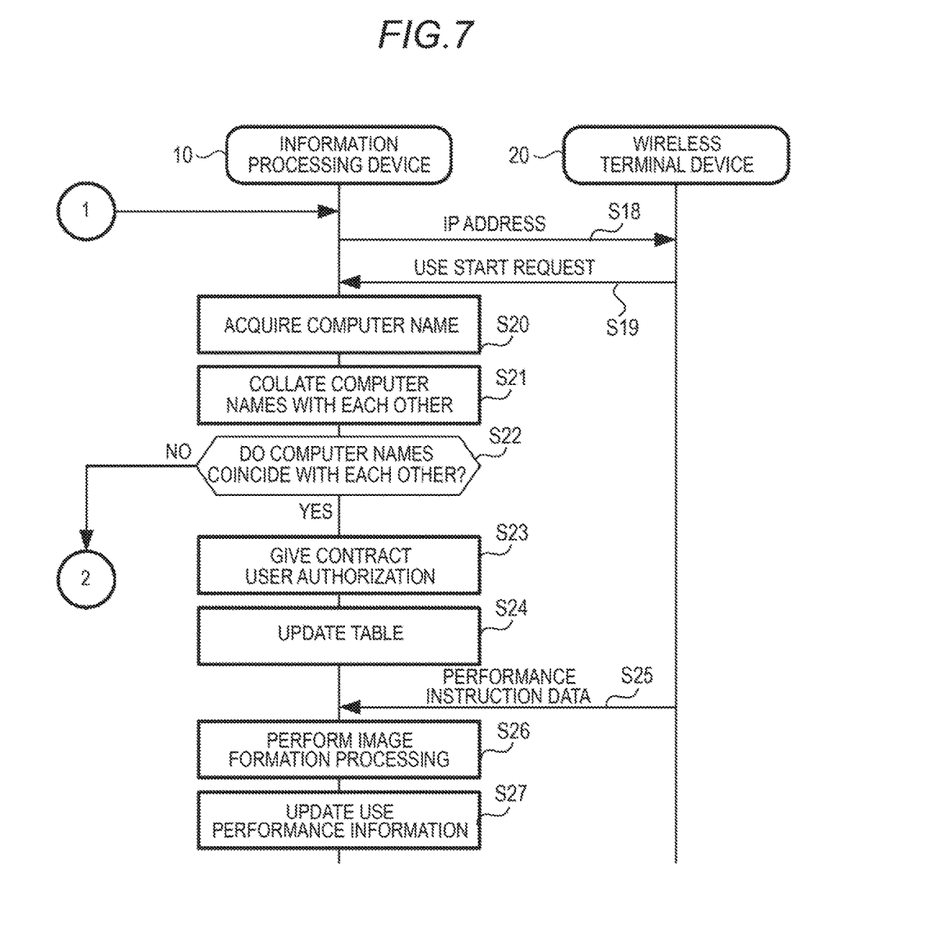
FIG. 7 is a sequence chart illustrating flow of processing subsequent to FIG. 6.
Figure 8:
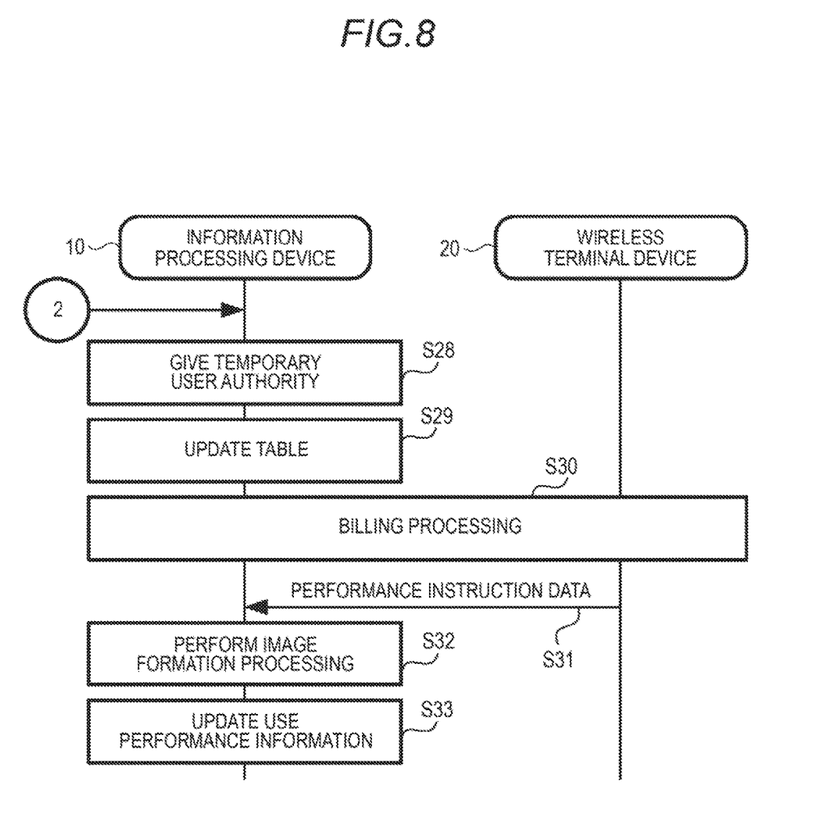
FIG. 8 is a sequence chart illustrating flow of processing subsequent to FIG. 7.

FIG. 6, FIG. 7, and FIG. 8 are sequence charts illustrating flow of processing which is performed by the information processing system 1.

In a case where a user of the wireless terminal device 20 uses the function of the information processing apparatus 10, the user carries the wireless terminal device 20 and visits a place where the information processing apparatus 10 is provided. At this time, the wireless communication unit 23 of the wireless terminal device 20 sequentially transmits probe requests (step S1). The probe request includes the Wi-Fi direct device address of the wireless communication unit 23, the chipset information, and information of the computer name, it is assumed that the probe request does not include Wi-Fi MAC address.

If the controller 11 of the information processing apparatus 10 receives the probe request through the wireless communication unit 13, the controller transmits prove response indicating that the probe request is received to the wireless terminal device 20 (step S2). Subsequently, the controller 11 acquires (extracts) the Wi-Fi direct device address from the probe request (step S3). Subsequently, the controller 11 converts the acquired Wi-Fi direct device address into the Wi-Fi MAC address in accordance with the conversion pattern 182 (step S4). Here, the controller 11 performs the conversion in accordance with a conversion pattern corresponding to chipset information which is acquired from the probe request.

Subsequently, the information processing apparatus 10 and the wireless terminal device 20 perform a connection operation for being connected by the Wi-Fi direct (step S5). In a case where the Wi-Fi MAC address which is acquired by conversion of the information processing apparatus 10 coincides with the Wi-Fi MAC address which is stored in the Memory 233 of the wireless terminal device 20, a connection is made by the connection operation in step S5.

If the connection is made, the controller 11 of the information processing apparatus 10 collates the Wi-Fi MAC address acquired by the conversion with the Wi-Fi MAC address of the table 181 (step S6). In addition, the controller 11 determines whether or not the Wi-Fi MAC address coincides with any one of the Wi-Fi MAC addresses of the table 181 (step S7).

In a case where it is determined that the reply is "YES" in step S7, the controller 11 issues an IP address which is assigned to the wireless terminal device 20, and transmits the IP address to the wireless terminal device 20 through the wireless communication unit 13 (step S8). If the controller 21 of the wireless terminal device 20 receives the IP address through the wireless communication unit 23, the controller transmits use start request for starting use of the function of the information processing apparatus 10 to the information processing apparatus 10 through the wireless communication unit 23 (step S9). The IP address which is received from the information processing apparatus 10 is used for transmitting the use start request.

If the use start request is received by the wireless communication unit 13, the controller 11 of the information processing apparatus 10 acquires (extracts) the computer name from the probe request which is transmitted in step S1 (step S10). Subsequently, the controller 11 collates the acquired computer name with the computer name of the table 181 (step S11). In addition, the controller 11 determines whether or not the computer name coincides with a computer name associated with the Wi-Fi MAC address which is acquired from the same probe request (step S12). Here, it is considered that the wireless terminal device 20 is the wireless terminal device 20A. In this case, in a case where the Wi-Fi MAC address is "99:88:77:66:55:44" and the computer name is "Professor11", the controller 11 determines that the reply is "YES" in step S12. In addition, the controller 11 gives the use authorization (here, contract user authorization) associated with the Wi-Fi MAC address and the computer name to the user of the wireless terminal device 20 (wireless terminal device 20A), in the table 181 (step S13).

Subsequently, the controller 21 of the wireless terminal device 20 transmits performance instruction data which instructs performing of processing to the information processing apparatus 10 through the wireless communication unit 23 (step S14). The aforementioned IP address is used for transmitting the performance instruction data. Here, it is assumed that "image formation processing" is instructed in which an image is formed by the transmission of the performance instruction data, based on image data included in the performance instruction data. In this case, if the controller 11 of the information processing apparatus 10 receives the performance instruction data through the wireless communication unit 13, the controller performs image formation processing according to the performance instruction data using the image forming unit 17 (step S15). In addition, the controller 11 updates the use performance information 183 in accordance with the performed image formation processing (step S16).

In this way, in a case where the controller 11 confirms validity of the user of the wireless terminal device 20 based on the Wi-Fi MAC address and the computer name, the controller gives the use authorization designated by the table 181 to the wireless terminal device 20.

In a case where it is determined that the reply is "NO" in step S12, that is, in a case where the computer name does not coincide with the computer name associated with the Wi-Fi MAC address acquired from the same probe request, the controller 11 issues warning to the effect that there is a possibility of spoofing by a third party (an example of notification) (step S17). The warning is issued by displaying a message that is, for example, "use is not allowed because the user may not be real" on the display 15. In a case where the warning is issued, the controller 11 does not give the use authorization, and does not perform the image formation processing. The reason why doing so is to prevent the Wi-Fi MAC address from being leaked and the use authorization from being give to a third party through an illegal way.

The warning in step S17 is not limited to displaying, and may be issued by outputting a sound, transmitting data, or the like.

In a case where it is determined that the reply is "NO" in step 57, that is, in a case where the Wi-Fi MAC address acquired from the probe request does not coincide with any one of the Wi-Fi MAC addresses of the table 181, the controller 11 proceeds to step S18 illustrated in FIG. 7. In this case, the controller 11 issues the IP address with respect to the wireless terminal device 20, and transmits the IP address to the wireless terminal device 20 through the wireless communication, unit 13 (step S18). The controller 21 of the wireless terminal device 20 which transmits the IP address transmits the use start request to the information processing apparatus 10 through the wireless communication unit 23 (step S19). Subsequently, the controller 11 of the information processing apparatus 10 acquires (extracts) the computer name from the probe request (step S20). Subsequently, the controller 11 collates the acquired computer name with the computer name of the table 181 (step S21). In addition, the controller 11 determines whether or not the computer name coincide with any one of the computer names registered in the table 181 (step S22). In a case where it is determined that the reply is "YES" in step S22, the controller 21 gives the contract user authorization to the user of the wireless terminal device 20 (step S23). Furthermore, the controller 11 adds the Wi-Fi MAC address and the computer name which are acquired from the probe request to the table 181 in association with the contract user authorization, and thus the table 181 is updated (step S24). The reason why doing so is that the computer name is registered in the table 181 and thus, it is considered that the Wi-Fi MAC address which has to be originally registered is not registered yet.

In addition, the controller 21 of the wireless terminal device 20 transmits the performance instruction, data for instructing, for example, image urination processing, to the information processing apparatus 10 through the wireless communication unit 23 (step S25). If the controller 11 of the information processing apparatus 10 receives the performance instruction data through the wireless communication unit 13, the controller performs the image formation processing, according to the performance instruction data using the image forming unit 17 (step S26). In addition, the controller 11 updates the use performance information 183 in accordance with the performed image formation processing (step S27).

In a case, where it is determined that the reply is "NO" in step S22, that is, in a case where it is determined that the computer name does not coincide with any one of the computer names of the table 181, the controller 11 proceeds to the processing of step S28 illustrated in FIG. 8. In a case where, for example, the wireless terminal device 20C is used, it is determined that the reply is "NO" in step S22. In this case, the controller 11 gives temporary user authorization to the user of the wireless terminal device 20 (step S28). Furthermore, the controller 11 adds the Wi-Fi MAC address and the computer name which are acquired from the probe request to the table 181 in association with the temporary user authorization, and thus, the table 181 is updated (step S29).

In addition, billing processing is performed between the information processing apparatus 10 and the wireless terminal device 20 (step S30). In a case where the function of the information processing apparatus 10 is used by the temporary user authority, the user needs to pay use fee for using the function. The processing related to the fee is the billing processing in step S30. A method of the billing processing is not limited in particular, and may be performed by electronic payment or may be performed by cash payment using a coin kit.

If the billing processing is completed, the controller 21 of the wireless terminal device 20 transmits performance instruction data for instructing, for example image formation processing to the information processing apparatus 10 through the wireless communication unit 23 (step S31). If the controller 11 of the information processing apparatus 10 receives the performance instruction data through the wireless communication unit 13, the controller performs image formation processing according to the performance instruction data using the image forming unit 17 (step S32). In addition, the controller 11 updates the use performance information 183 in accordance with the performed image formation processing (step S33).

According to the exemplary embodiment described above, if the wireless terminal device 20 approaches, the information processing apparatus 10 performs wireless communication with the wireless terminal device by the Wi-Fi direct, thereby acquiring the Wi-Fi MAC address. In addition, the information processing apparatus 10 gives use authorization of a function associated with the Wi-Fi MAC address to the user of the wireless terminal device 20. In this way, the user need not perform a login operation to log in to the information processing apparatus 10. Hence, according to the information processing apparatus 10, it is possible to reduce processing to be performed until the use authorization of the function of the information processing apparatus 10 is given to the wireless terminal device 20, and an operation to be performed by the user, compared to a case where the use authorization for the inaction is given to the user in accordance with the login operation of the user.

In addition, the information processing apparatus 10 confirms validity of the user of the wireless terminal device 20 by collating, the Wi-Fi MAC address with the computer name. In addition, the information processing apparatus 10 performs warning indicating that there is a possibility of spoofing by a third party, updating of the table T, and processing of giving the use authorization or the like, based on the results of the collation of the Wi-Fi MAC address and the computer name. Thereby, a possibility of illegal login to the information processing apparatus 10 by a third party is reduced, and giving of proper use authorization is performed. In addition, the Wi-Fi MAC address of the wireless terminal device 20 is not transmitted through a communication path, in the information processing system 1, and thus, a possibility of leakage is reduced.

The exemplary embodiment of the invention may be realized by an aspect different from the aforementioned exemplary embodiment. In addition, modification examples which will be described below may be combined to each other.

MODIFICATION EXAMPLE 1

The information processing apparatus 10 may perform processing which is instructed by the wireless terminal device 20 to which contract user authorization is given, prior to processing which is instructed by the wireless terminal device 20 to which temporary user authority is given.

Figure 9:
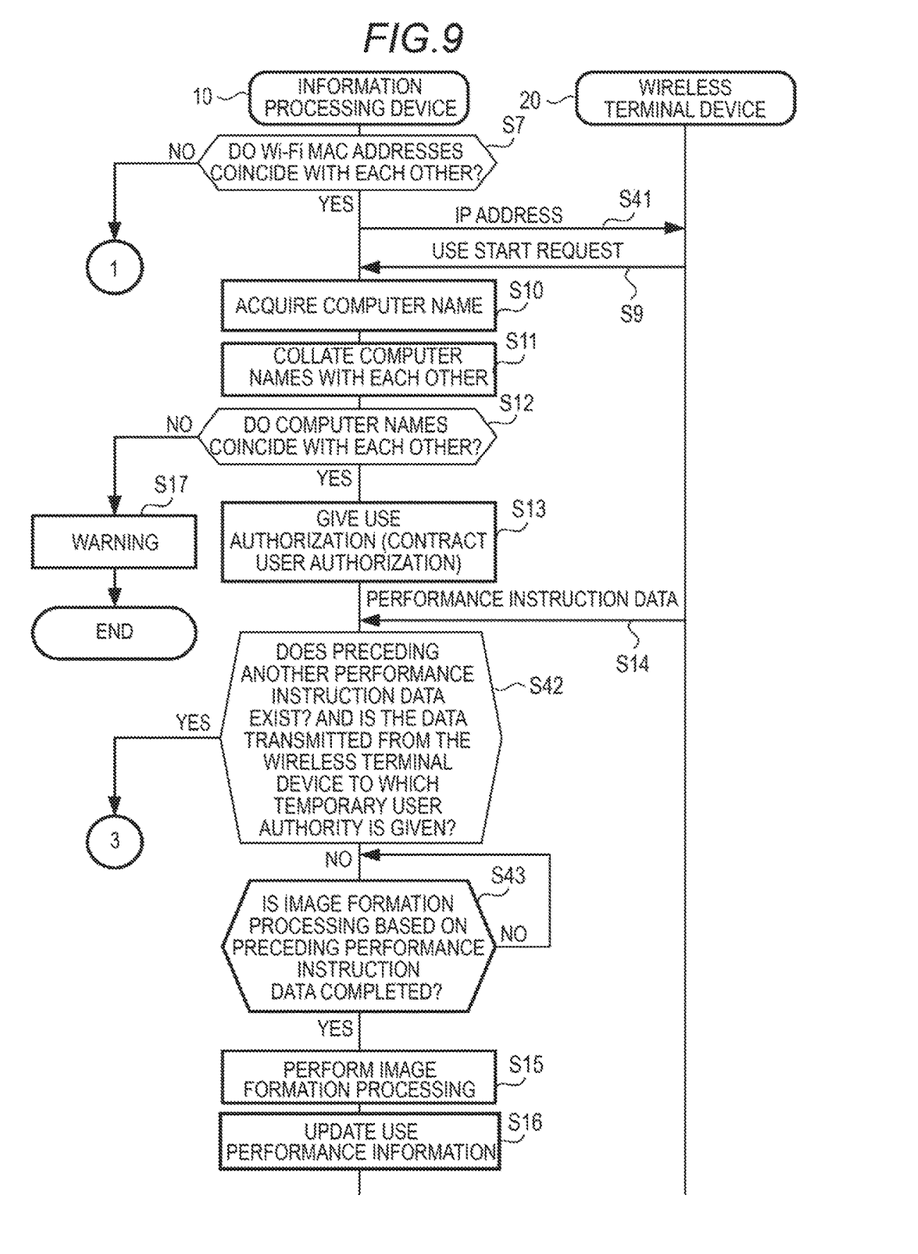
FIG. 9 is a sequence chart illustrating flow of processing which is performed by the information processing system according to a modification example of the present invention.
Figure 10:
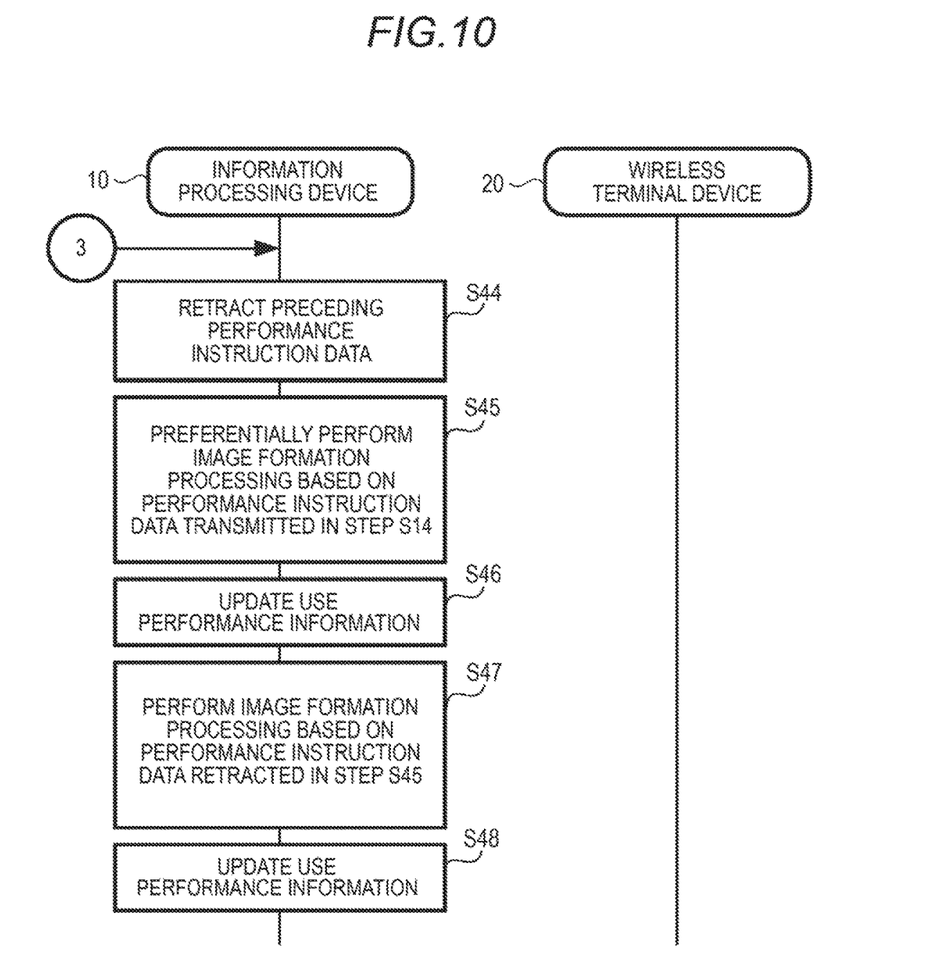
FIG. 10 is a sequence chart illustrating flow of processing subsequent to FIG. 9.

FIG. 9 and FIG. 10 are sequence charts illustrating flow of processing which is performed by the information processing system 1 according to the modification example.

Step S1 to step S6 are the same as in the aforementioned exemplary embodiment, and thus, illustrating and description thereof will be omitted. In addition, if it is determined that the reply is "YES") in step S7, the controller 11 issues an IP address belonging to an address band corresponding to contract user authorization, with respect to the wireless terminal device 20, and transmits the IP address to the wireless terminal device 20 (step S41). For example, it is assumed that, for example, "192.168.0.*" ("*" represents any one value of, for example, 101 to 199) is determined as the address band corresponding to the contract user authorization. In this case, the controller 11 issues, for example, "192.168.0.101" as the IP address. The controller 21 of the wireless terminal device 20 which receives the IP address transmits use start request to the information processing apparatus 10 through the wireless communication unit 23 (step S9). Subsequently, the controller 11 of the information processing apparatus 10 acquires (extracts) a computer name from probe request (step S10). Subsequently, the controller 11 collates the acquired computer name with a computer name of the table 181 (step S11). In addition, the controller 11 determines whether or not the acquired computer name is associated with use authorization associated with the acquired Wi-Fi MAC address (step S12). In a case where it is determined that the reply is "YES" in step S12, the controller if gives the contract user authorization (an example of first use authorization) to the user of the wireless terminal device 20 (step S13). In addition, the controller 21 of the wireless terminal device 20 transmits performance instruction data for instructing, for example, image formation processing to the information processing apparatus 10 through the wireless communication unit 23 (step S14).

Subsequently, the controller 11 determines whether or not another performance instruction data proceeding the performance instruction, data which is transmitted by the processing in step S14 exists, and the performance instruction data is transmitted from the wireless terminal device 20 to which temporary user authority (an example of second use authorization) is given (step S42). In a case where it is determined that the reply is "NO" in step S42, the controller 11 determines whether or not image formation processing based on the preceding performance instruction data is completed (step S43). If it is determined that the reply is "YES" in step S43, the image formation processing according to the performance instruction data which is transmitted by the processing in step S14 is performed by using the image forming unit 17 (step S15). In addition, the controller 11 updates the use performance information 183 in accordance with the performed image formation processing (step S16).

In a case where it is determined that the reply is "YES" in step S42, the controller 11 proceeds to processing in step S44 illustrated in FIG. 10. For example, it is assumed that the information processing apparatus 10 receives processing instruction data from the wireless terminal device 20B (an example of a second wireless terminal device), prior to the wireless terminal device 20A (an example of a first wireless terminal device). In this case, the controller 11 retracts the performance instruction data from the preceding wireless terminal device 20B (step S44). Here, the retracting indicates processing in which the performance instruction data arranged in the sequence of performance of processing is excluded from the arrangement once, and is transmitted to the memory 18. In addition, the controller 11 preferentially performs image formation processing according to the performance instruction data which is transmitted by the processing in step S14, using the image forming unit 17 (step S45). That is, the controller 11 preferentially performs the image formation processing according to the processing instruction data from the wireless terminal device 20A. In addition, the controller 11 updates the use performance information 183 in accordance with the performed image formation processing (step S46).

Subsequently, the controller 11 reads the performance instruction data which is retracted by the processing in step S45, from the memory 18. In addition, the controller 11 performs the image formation processing according to the performance instruction data which is read, using the image forming unit 17 (step S47). In addition, the controller 11 updates the use performance information 183 in accordance with the performed image formation processing (step S48).

In this way, the information processing apparatus 10 performs processing which is instructed from the specific wireless terminal device 20 in accordance with the use authorization that is given to each wireless terminal device 20, prior to other processing. In other words, according to the information processing apparatus 10, service with higher quality than that for a user to which contract user authorization is given is provided.

MODIFICATION EXAMPLE 2

In a case where it is determined that the reply is "YES" in step S12, the controller 11 may determine whether or not there is a possibility that an illegal connection is made by the wireless terminal device 20, before contract user authorization is given in step S13. For example, in a case where it is determined that a device other than the wireless terminal device 20 is trying to access to the information processing apparatus 10 or other information processing apparatuses, using the same computer name as the computer name which is collated in step S11, the controller 11 determines that there is a possibility of an illegal connection. In a case where it is determined that there is a possibility of an illegal connection, the controller 11 does not give the contract user authorization in step S13, and proceeds to step S18.

In addition, in a case where it is determined that the reply is "YES" to step S22, the controller 11 may determine whether or not there is a possibility that an illegal connection is made by the wireless terminal device 20, before contract user authorization is given in step S23. A method of determining whether or not there is a possibility of illegal connection is the same as described above. In a case where it is determined that there is a possibility of illegal connection, the controller 11 does not give the contract user authorization in step S23, and proceeds to step S28.

That is, in a case where it is determined that there is a possibility that illegal connection is being made, the controller 11 levies fees on a user of the wireless terminal device 20 as a temporary user.

Furthermore, in a case where the controller 11 determines that there is a possibility that an illegal connection is being made and gives temporary user authority to the user of the wireless terminal device 20, the controller updates the use performance information 183 in association with a contract user, not as a normal temporary user. Thereby, the use performance information 183 is updates not as use results of the normal temporary user, but as use results of the contract user. For example, the controller 11 can manage the tact that is completed by the previous billing processing, as the use results of the contract user, such as "being collected by billing because use, of the contract user is unable to be confirmed".

MODIFICATION EXAMPLE 3

The first identification information of the exemplary embodiment of the invention is not limited to the Wi-Fi MAC address, and may be identification information which identifies the wireless communication unit 23. The second identification information of the exemplary embodiment of the invention is not limited to the computer name, and may be identification information which identifies the wireless terminal device 20. The wireless communication of the exemplary embodiment of the invention is not limited to wireless communication which is performed by the Wi-Fi direct, and may be short range wireless communication such as Bluetooth®, or wireless communication which is performed through line such as the communication line NW. In addition, the use authorization is not limited to the contract user authorization and the temporary user authority, and may employ other use authorizations.

In addition, a part of the configuration or the operation described in the aforementioned exemplary embodiments may be omitted or modified. For example, the function of the address conversion unit 111 may be omitted. In addition, the collation which uses the computer name may be omitted. In addition, the warning of step S18 or the processing described with reference to FIGS. 7 to 10 may be omitted.

In addition, the management server 30 may not be included in the information processing system 1. In this case the information processing apparatus 10 may manage updating or the like of the table T. In addition, the collation of the Wi-Fi MAC address or the computer name may not be performed by the information processing apparatus 10, and may be performed by the management server 30. In this case the information processing apparatus 10 need not store the table 181, and the collation of the Wi-Fi MAC address or the computer mime is performed by the management server 30.

The hardware configuration of the information processing apparatus 10 is not limited to the configuration described in the exemplary embodiment. As long as a required function can be realized, the information processing apparatus 10 may have any type of hardware configurations. The information processing apparatus 10 may be an information processing apparatus other than the image forming apparatus, may be an information processing apparatus such as a scan device, a copy machine, or a facsimile device, and may be an information processing apparatus such as a personal computer or a server device.

Each function which is performed by the information processing apparatus 10 according to each exemplary embodiment described above may be realized by one or more hardware circuits, may be realized by an arithmetic device which executes one or more programs, or may be realized by combining those. In addition, in a case where the function the information processing apparatus 10 is realized by using the program, the program may be provided in a state of being stored in a computer-readable recording medium, such as a magnetic recording medium (magnetic tape, magnetic disk (hard disk drive: HDD), or flexible disk (FD)), an optical recording medium (optical disk, or the like), a magneto-optical recording medium, or a semiconductor memory, or may be transmitted through a line such as Internet. In addition, the exemplary embodiment, of the invention can be understood as an information processing method which is performed by a computer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
 a memory configured to store instructions; and
 at least one processor configured to execute, in response to being loaded with the instructions from the memory
 a first wireless communication unit;
 a first acquisition unit configured to acquire first identification information which identifies a second wireless communication unit configured to be included in an external wireless terminal device and executed by a processor, through the first wireless communication unit, the first identification information being a physical address; and
 a use authorization unit configured to give use authorization associated with the first identification information which is acquired by the first acquisition unit to a user of the external wireless terminal device based on a table for managing the use authorization of a function of a host information processing apparatus in association with the first identification information, wherein the use authorization is associated with the first identification information and second identification information identifying the external wireless terminal device in the table, and the information processing apparatus further comprises a second acquisition unit configured to be executed by the processor and acquire the second identification information through the first wireless communication unit, an updating unit, in a case where the acquired first identification information k not associated with the use authorization associated with the second identification information which is acquired by the second acquisition unit in the table, configured to be executed by the processor and update the table so as to associate the first identification information with the use authorization, a notification unit configured to be executed by the processor and perform notifying in a case where the second identification information which is acquired by the second acquisition unit is not associated with the use authorization associated with the acquired first identification information in the table, and an address conversion unit configured to be executed by the processor and convert data which is transmitted through the second wireless communication unit and is received by the first wireless communication unit into the physical address in accordance with a predetermined rule, wherein a Wi-Fi MAC address is not transmitted from the second wireless communication unit to the first communication unit through a communication path.

2. The information processing apparatus according to claim 1, wherein the external wireless terminal device comprises a first wireless terminal device and a second wireless terminal device, and the information processing apparatus further comprises a performance unit configured to be executed by the processor and perform processing related to a function for which the use authorization is given by the use authorization unit, and preferentially performs processing which is instructed by the first wireless terminal device to which first use authorization is given rather than processing which is instructed by the second wireless terminal device to which second use authorization is given.

3. An information processing method of an information processing device including:

a memory configured to store instructions; and at least one processor configured to execute, in response to being loaded with the instructions from the memory:

a first wireless communication unit, the information processing method comprising:

acquiring first identification information which identifies a second wireless communication unit configured to be included in an external wireless terminal device and executed by a processor, through the first wireless communication unit, the first identification information being a physical address;

giving use authorization associated with the acquired first identification information to a user of the external wireless terminal device, based on a table for managing the use authorization of a function of the information processing device in association with the first identification information;

associating the use authorization with the first identification information and second identification information identifying the external wireless terminal device in the table;

acquiring the second identification information through the first wireless communication unit;

updating, in a case where the acquired first identification information is not associated with the use authorization associated with the acquired second identification information, the table so as to associate the first identification information with the use authorization;

performing notification in a case where the acquired second identification information is not associated with the use authorization associated with the acquired first identification information in the table; and converting data which is transmitted through the second wireless communication unit and is received by the first wireless communication unit into the physical address in accordance with a predetermined rule, wherein a Wi-Fi MAC address is not transmitted from the second wireless communication unit to the first communication unit through a communication path.

4. A non-transitory computer readable medium storing a program causing a computer of an information processing apparatus including a first wireless communication unit, to execute:

acquiring first identification information which identifies a second wireless communication unit configured to be included in an external wireless terminal device and executed by a program, through the first wireless communication unit, the first identification information being a physical address;

giving use authorization associated with the acquired first identification information to a user of the external wireless terminal device, based on a table for managing the use authorization of a function of the information processing apparatus in association with the identification information;

associating the use authorization with the first identification information and second identification information identifying the external wireless terminal device in the table;

acquiring the second identification information through the first wireless communication unit;

updating, in a case where the acquired first identification information is not associated with the use authorization associated with the acquired second identification information, the table so as to associate the first identification information with the use authorization;

performing notification in a case where the acquired second identification information is not associated with the use authorization associated with the acquired first identification information in the table; and converting data which is transmitted through the second wireless communication unit and is received by the first wireless communication unit into the physical address in accordance with a predetermined rule, wherein a Wi-Fi MAC address is not transmitted from the second wireless communication unit to the first communication unit through a communication path.

* * * * *